United States Patent

[11] 3,585,914

| [72] | Inventor | Sukeyuki Oki<br>Clifton, N.J. |
|---|---|---|
| [21] | Appl. No. | 827,650 |
| [22] | Filed | May 26, 1969 |
| [45] | Patented | June 22, 1971 |
| [73] | Assignee | Atlas-Rand Corporation<br>Paramus, N.J. |

[54] CAMERA MECHANISM FOR ROTATING A LAMP SOCKET
28 Claims, 10 Drawing Figs.

[52] U.S. Cl. .................................................. 95/11.5 R, 240/37.1
[51] Int. Cl. ...................................................... G03b 9/70
[50] Field of Search ........................................... 95/11, 11 L, 11.5; 240/1.3, 37, 37.1

[56] References Cited
UNITED STATES PATENTS

| 3,162,108 | 12/1964 | Knorr et al. | 95/11.5 |
| 3,363,526 | 1/1968 | Ernisse | 95/11.5 |
| 3,416,424 | 1/1968 | Harvey | 95/11 X |

*Primary Examiner*—Samuel S. Matthews
*Assistant Examiner*—Fred L. Braun
*Attorney*—Ralph R. Roberts ABSTRACT: A photographic camera mechanism having a rotatable socket adapted to receive and removably retain a multilamp photoflash unit. The mechanism rotates the socket between established limits and, during this rotation, the contact leads of one of the lamps is brought into contact with electrical contacts conductively connected to a battery source so as to ignite the photoflash lamp and provide light for the scene in front of the camera. A stop member is provided to insure that the photoflash unit is not accidentally rotated to cause an igniting of the photoflash lamp prior to an exposure operation of the camera. The camera shutter is actuated in response to and in synchronization with the rotation of the socket between the established limits.

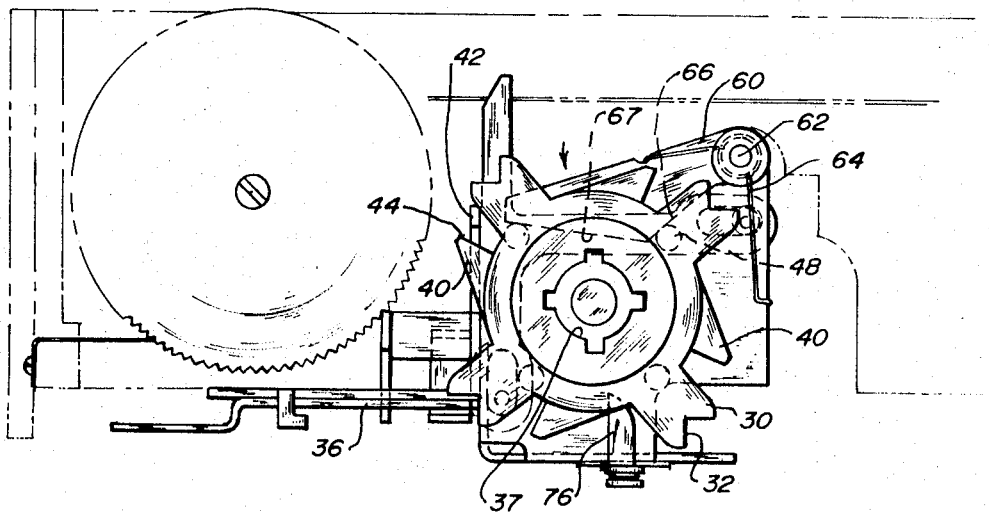
Fig_2
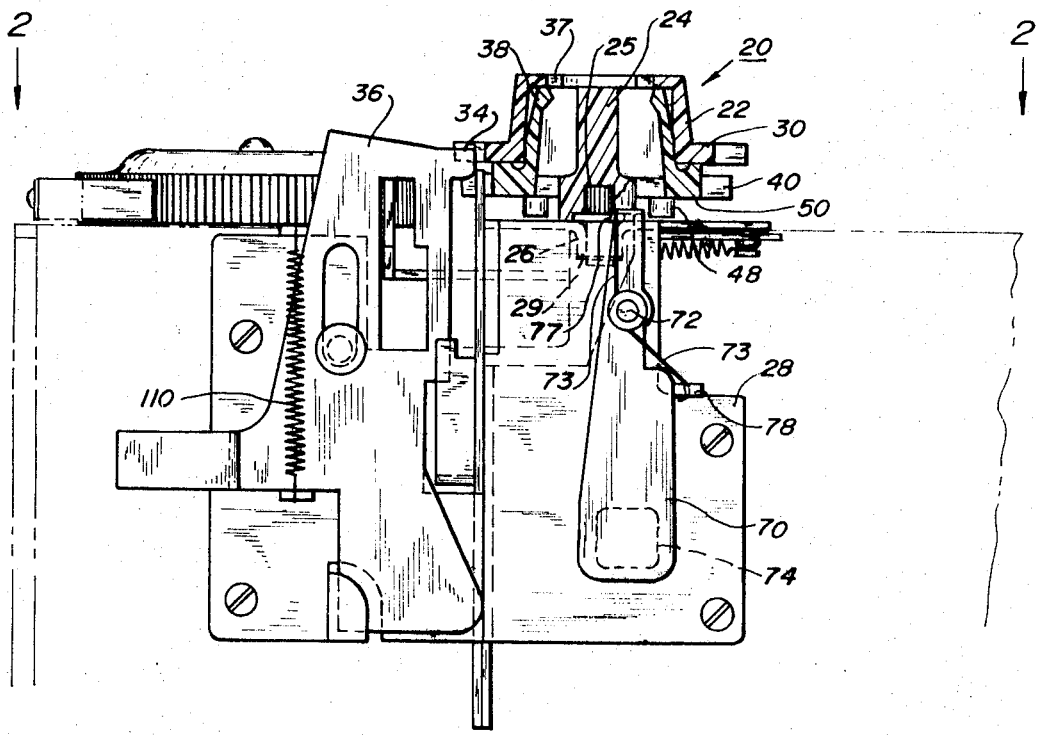
Fig_1
INVENTOR.
SUKEYUKI OKI
BY Ralph R. Roberts
AGENT.

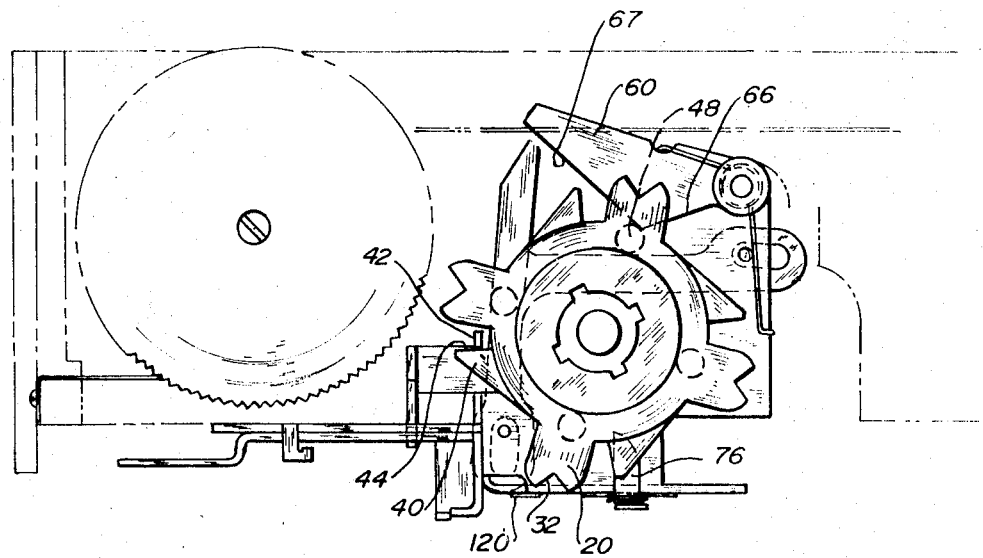
Fig_4
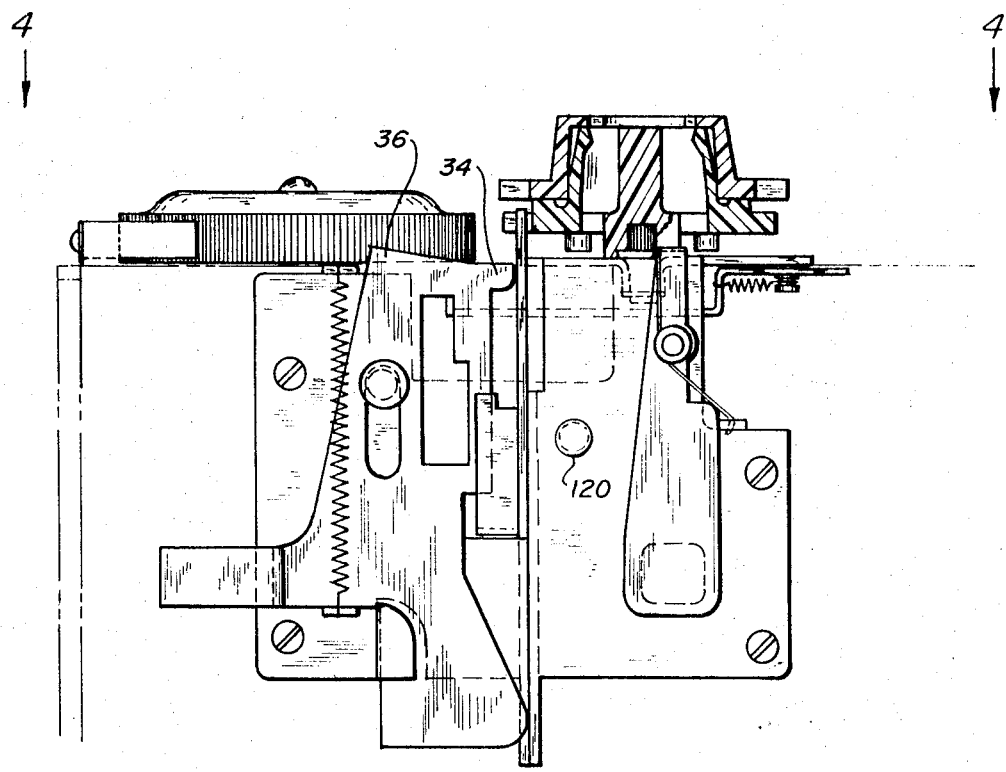
Fig_3
INVENTOR.
SUKEYUKI OKI
BY
Ralph R. Roberts
AGENT.

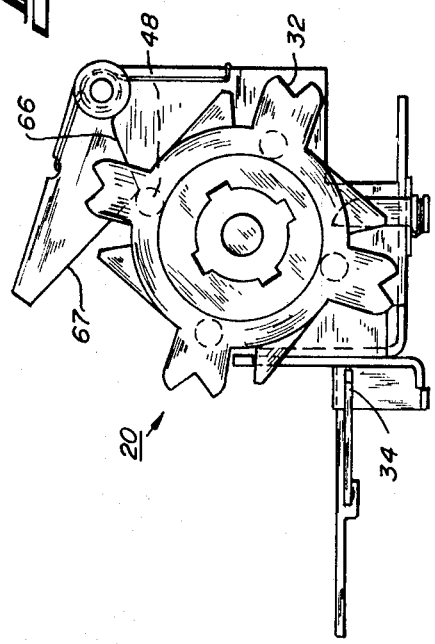
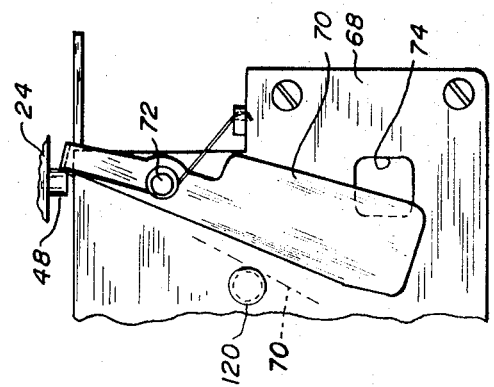
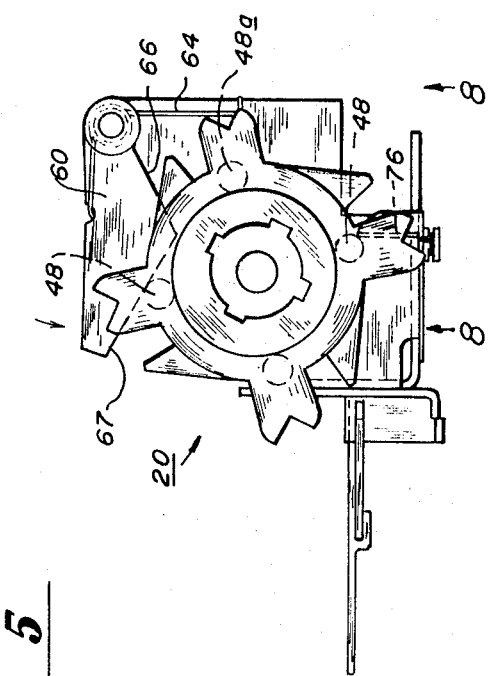
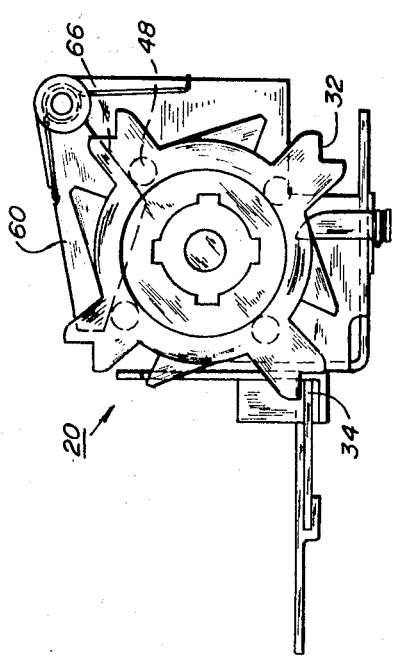

INVENTOR.
SUKEYUKI OKI

CAMERA MECHANISM FOR ROTATING A LAMP SOCKET

BACKGROUND OF THE INVENTION

1. Field of the Invention

The field of invention relates to a photographic camera mechanism having an illumination synchronization system.

2. Description of the Prior Art

With the development and acceptance of a disposable multilamp photoflash unit or package for use with still cameras, there have been developed and marketed several still cameras, each having a socket and mechanism for removably receiving and automatically indexing this photoflash package. Insofar as is known, the indexing mechanism successively places a fresh or unfired lamp in an electronic firing circuit and, on the occasion of the actuation of the shutter mechanism, the circuit is closed by switch means to fire the photoflash lamp. This multilamp photoflash package usually has four lamps and is commonly identified as a "flash cube."

It is also known to fire the lamp and, after ignition of the lamp has been accomplished, to rotate the bulb so as to distribute the flash of light. Such a flash system is shown in U.S. Pat. No. 3,363,526 issued Jan. 16, 1968 to P. J. Ernisse. In this patent the flash cube or package is disposed at a predetermined first position which is preferably at 15° to 30° previous to a line parallel to the lens axis of the camera. The firing of the lamp, the rotation of the flashlamp package and the socket of the Ernisse patent is caused by an actuation of body release. The mechanism movement is preferably driven by means of a spring mechanism previously wound during the advancing of the film and the cocking or setting of the shutter apparatus.

In the present invention the socket is initially rotated by a camming motion provided by the actuation of a release lever. There is no prior cocking of the shutter and the lamp is not ignited until the socket is in motion and has moved a determined distance from its initial position. The shutter is actuated by the rotation of socket and provides therewith a positive synchronization of flash and exposure.

SUMMARY OF THE INVENTION

The camera mechanism of this invention includes a rotatable socket carried on the top portion of a camera body. This socket is adapted to removably receive a lamp which may be a four-lamp package. Detent or engaging means is provided so that the socket can be and is rotated only during the exposure actuation. The socket is rotated from one "at-rest" position to a next determined "at-rest" position, which difference in positions, in the preferred embodiment, is about one-quarter revolution. Intermediate the start and finishing "at-rest" positions of the socket, the contact leads of a lamp are brought in way of fixed contacts conductively supplied with current from a battery source so as to ignite the flashlamp. A biased camming member carried by the camera body is disposed to be engaged by one of four equally spaced protruding pin portions of the rotating socket. As the socket approaches a point about midway in its rotation from the start to the finishing "at-rest" positions, the camming member engages the protruding pin portion to provide the propulsive force necessary to move the socket to its finishing position whereat the socket is stopped and latched into fixed condition until the film is advanced to a new exposure condition and a lever is actuated. The rotation of the socket also provides means for the protruding pin to engage an extending portion of a pivoted shutter lever so as to swing the shutter lever and uncover the shutter aperture to expose the film. Where an exterior flash is to be used with the camera, a rotating switch base having an electrical contact may act as the switch to cause an illumination to be made in synchronization with a shutter also actuated by the rotating switch base.

It is an object of this invention to provide a camera mechanism wherein a rotatable socket is adapted to removably receive a flashlamp and as said socket is rotated the contact leads of the lamp are brought in way of fixed electrical contacts connected to a battery source so as to cause an igniting of the flashlamp as it is rotated with and by the socket.

It is a further object of this invention to provide a camera mechanism wherein the rotatable socket additionally has a plurality of pins disposed to each sequentially engage a shutter arm so that as a flashlamp is moved to a firing position one of the pins moves into engagement with the shutter arm to move the shutter and uncover an aperture and permit an exposure to be made.

It is a still further object of this invention to provide a camera mechanism wherein the rotatable socket has engaging means which is disposed to mate with an actuating lever and retain the socket in a locked nonrotatable condition until the lever is actuated to cause an exposure to be made by the rotating of the socket and wherein the equally spaced pins on the socket are disposed to be engaged by a biased cam arm and during the rotation of the socket said biased cam arm engages one of the pins to provide a propulsive force and means for completing the rotative actuation of the socket.

BRIEF DESCRIPTION OF THE DRAWINGS

FIG. 1 represents a front view of the camera mechanism of this invention, the view being partly in section and showing the rotatable flash cube socket and associated mechanism;

FIG. 2 represents a plan or top view of the camera mechanism of FIG. 1, the view taken on the line 2-2 and looking in the direction of the arrows and showing the socket in a locked or retained condition;

FIG. 3 represents a front view of the camera mechanism of FIG. 1 but with the plunger or actuating member moved to its lowermost operating position;

FIG. 4 represents a plan or top view of the mechanism of FIG. 3, the view taken on the line 4-4 and looking in the direction of the arrows and showing the socket released from the locking means and partially rotated from the position of FIG. 2;

FIG. 5 represents a fragmentary plan view showing the socket mechanism in its retained condition and position of FIG. 1;

FIG. 6 represents a fragmentary plan view of the socket mechanism of FIG. 5 but with the socket released and in a partly rotated or advanced position;

FIG. 7 represents a fragmentary plan view of the socket mechanism of FIG. 6 but in a still further rotated condition and with a pin portion of the socket in engagement with an arm portion of the pivoted shutter member;

FIG. 8 represents a fragmentary front view of the mechanism of FIG. 7 as taken on the line 8-8 thereof and looking in the direction of the arrows and showing the shutter arm moved to partly uncover the exposure aperture;

In the following description and in the claims various details will be identified by specific names for convenience. These names, however, are intended to be generic in their application. Corresponding reference characters refer to like members throughout the several figures of the drawings.

Figure 9:
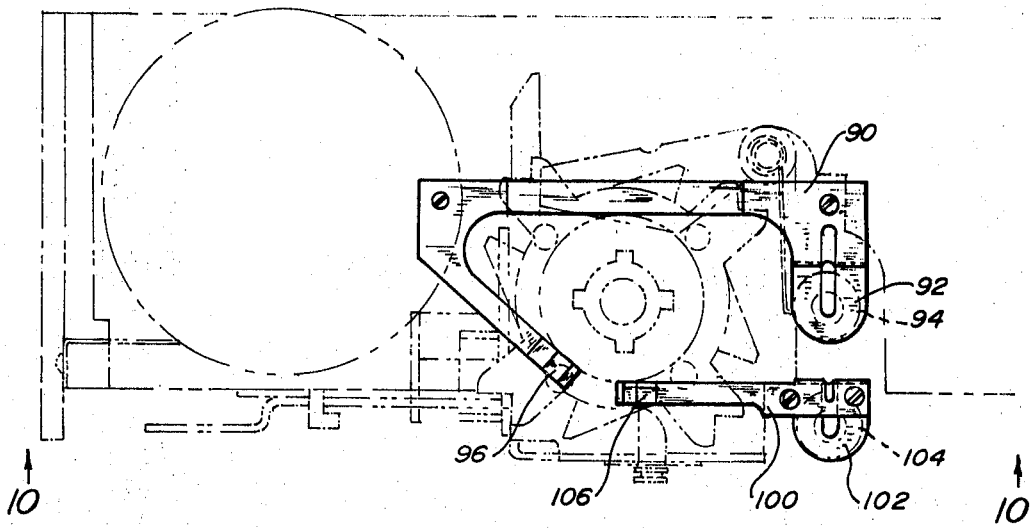
FIG. 9 represents a partly schematic plan view showing in particular the relationship of the electrical conductive means and their contact ends as they are positioned in way of the contacts of a flashlamp carried by the socket as it is rotated.

The drawings accompanying, and fragmentary part of, this specification disclose certain details of construction for the purpose of explanation of the broader aspects of the invention, but it should be understood that structural details may be modified in various respects without departure from the concept and principles of the invention.

DESCRIPTION OF THE PREFERRED EMBODIMENT

Referring now in detail to the camera mechanism and in particular to FIGS. 1 and 2 wherein a rotatable socket adapted to receive multilamp photoflash assemblies conventionally called "flash cubes" is generally identified as 20 and in FIG. 1 is shown in section. This socket assembly 20 includes an outer shell 22 mounted on an inner molded core 24 which is carried by a pin 25. This pin is rotatably carried in a bearing journal 26 preferably formed as a part of a front plate 28. A snapring or press-fit washer 29 is mounted on the inner end of the pin 25 so as to retain the socket 20 in the bearing journal 26 of the plate 28.

Formed as an integral part of the outer shell 22 are four extending notch portions 30 which are equally disposed around the shell. A notch 32 is formed in the end of each portion 30 and is disposed to be entered and engaged by a tab portion 34 of a vertically reciprocable front slide member 36. This tab portion is disposed to engage the notch 32 when the tab portion is in its up position. The notch 32 and tab 34 are sized and positioned so that when engaged the socket assembly 20 is restrained from rotating forwardly or backwardly. A shaped access 37 formed in the upper end of shell 22 is disposed to pass and receive the stem portion of a flash cube not shown. Spring fingers 38 are shaped so as to releasably grip the flash cube stem after the stem is passed through the access 37. The fingers 38, in the exemplified embodiment, are four in number and are molded as an integral part of the inner core 24.

Immediately below the flange portion of shell 22 and as a part of the inner core 24 are wing members 40 which are four in number and with the socket in the "at-rest" position of FIG. 2 an advancing lever means 42 is disposed to move forward and engage face surface 44 of the wing member 40. Associated means is provided to actuate lever means 42 so that as front slide member 36 is moved downwardly to release tab 34 from notch 32 the forwardly moving lever 42 engages face 44 to cause socket assembly 20 to rotate counterclockwise in bearing journal 26. Also mounted on, or molded as part of, the core member 24 are four downwardly extending pins 48, which pins extend below the lower surface 50 of the core 24.

Referring now in particular to FIG. 2, it is to be noted that pivotally mounted on and carried by front plate 28 is a camming member 60. The right end of this member 60 is rotatably mounted on a pin 62 and by means of spring 64 is biased counterclockwise as indicated by the arrow. A camming surface 66 of the member 60 as seen in dashed outline is disposed to be engaged by a pin 48 of the core member 24. As is to be seen in FIGS. 4, 6 and 7, the counterclockwise rotation of the socket causes the pin 48 to engage surface 66 so as to move the member 60 outwardly for a purpose to be hereinafter more fully described. Leftwardly of and at an angle of about 135° to surface 66 there is disposed an adjacent surface 67 which engages pin 48 at a later time in the rotation of the socket.

Referring again to FIG. 1, it is to be noted that carried upon the front plate 28 is a shutter lever 70 which is pivotally mounted on a pin 72 carried by and extending from the plate 28. In its normal or "at-rest" attitude and as urged by spring 73 the lower portion of this shutter lever 70 is disposed to cover an aperture 74 through which light is admitted to expose the film when the lower end of the shutter lever is moved leftwardly. The upper end of the shutter lever 70 has an inturned arm portion 76 which lies in way of the transcribed path of the pins 48 as the socket is rotated. The spring 73 is bent so as to be carried on pin 72 with one end engaging a tab 77 formed on the upper end of shutter lever 70 to urge the lever counterclockwise around the pin 72. The other end of the spring 73 is mounted in and retained by a stop member 78 which is carried by and extends from front plate 28. The left face or edge of member 78 is positioned so as to act as a positive and limiting stop for the biased rotational movement of the shutter lever 70 around pin 72.

Referring next to FIGS. 3 and 4, the mechanism of FIGS. 1 and 2 has been actuated so that front slide member 36 has been moved downwardly to its lowermost position. In this movement, tab 34 is carried from locking engagement with the notch 32 of the socket 20. As thus released, the socket may be and has been rotated a short distance. This movement of some of the mechanism members is particularly noted in FIG. 4 wherein the advancing lever 42 has moved forwardly to engage the face surface 44 of wing member 40 and move this member forwardly and with this extent of movement, the flash cube socket 20 has been rotated about 30° from the "at-rest" position of FIG. 2. Camming member 60 has been cammed outwardly by pin 48 as it engages surface 66 until the rotation of the socket has brought the adjacent camming surface 67 into thrust engagement with pin 48 so as to urge socket 20 to its next "at-rest" position.

Referring next and particularly to the fragmentary plan views of FIGS. 5, 6 and 7, it is to be noted that in FIG. 5 the pin 48 is in engagement with the camming surface 66 of member 60. This fragmentary showing corresponds to the more detailed showing of FIG. 2 and particularly is shown the tab member 34 as it engages notch 32 to provide a locked condition of the socket 20.

Referring next to the fragmentary view of FIG. 6, it is to be noted that the advancement of the flash cube socket 20 corresponds to the more detailed showing of FIG. 4 and as there is shown and above-described the advancing lever means 42 has engaged surface 44 of wing member 40 and moved said member forwardly. Tab member 34 is below and out of engagement of notch 32 and pin 48 has passed the apex defining the camming surfaces 66 and 67.

Referring next to the fragmentary views of FIGS. 7 and 8, it is to be noted that the rotation of the flash cube socket 20 is farther than in FIG. 6. The advancement mechanism which actuates and moves lever means 42 forwardly insures that as front slide member 36 reaches its lowermost position the socket 20 is rotated sufficiently so that pin 48 is brought from camming surface 66 and in way of the adjacent camming surface 67. For descriptive clarity of the operation, this camming surface 67 is hereinafter called the "propulsive" camming surface. After the pin 48 moves onto said propulsive camming surface 67 the spring 64 urges the member 60 counterclockwise in the direction as indicated by the arrow. This propulsive force causes the socket to continue to rotate until the succeeding pin, identified as 48a, comes into engagement with camming surface 66. In its propulsive action the spring 64 urges the socket 20 forwardly at substantially like rates of speed. The bias inherent in the construction of the spring is used as the generally governing factor in the propulsive action produced. As the camming member 60 engages a pin 48 to continue and complete the rotation of the socket 20, a diametrically opposite pin 48 moves into engagement with the inturned arm 76 of the pivoted shutter lever 70 to cause the lever to move counterclockwise around pin 72 and provide a film exposure with the uncovering of aperture 74.

Figure 10:
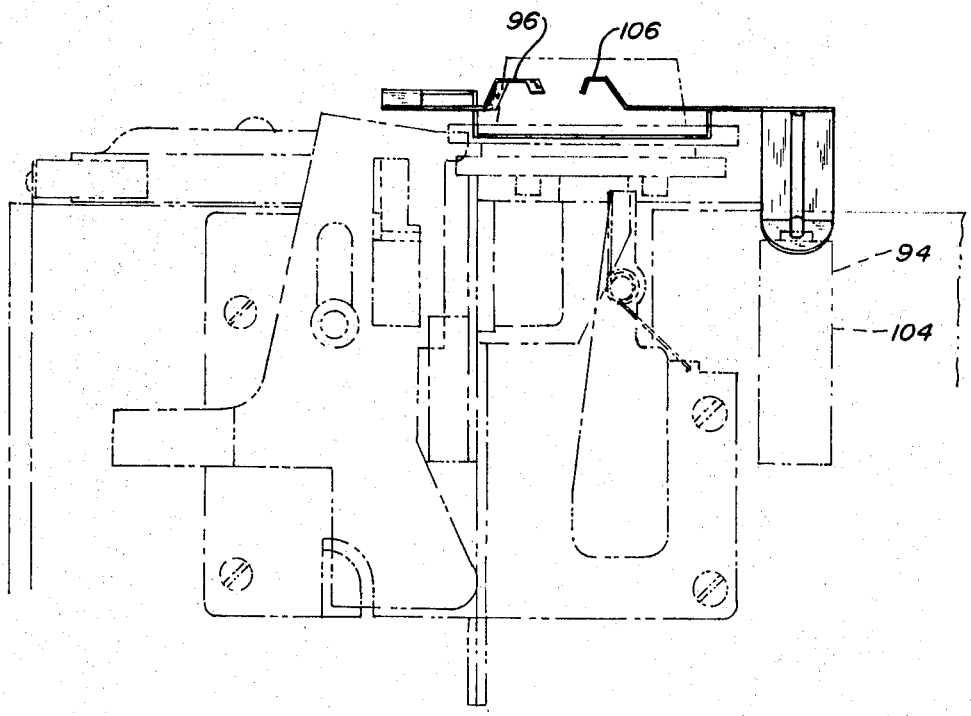
FIG. 10 represents a front view of the electrical conductive and contact system of FIG. 9.

Referring finally to FIGS. 9 and 10, there is illustrated the electrical conductive means of the camera for use in combination with the rotation of the socket 20. This electrical means includes a conductor 90 attached to a camera body cover member not shown. This conductor 90 is formed and mounted so as to bring an inner end 92 in way of an end of a battery 94 as shown in phantom outline in both FIGS. 9 and 10. This member 90, of course, is made of an electrically conductive material and is formed so that a spring end 96 is disposed to lie in a determined position and plane so as to conductively engage one of the contacts of a flashlamp as the socket in its rotation is brought to a position about 45° from the position of FIG. 2. This position is contemplated to bring the flashlamp to a like 45° position from the front when the conductive contact is made. A second conducting member 100 is also formed and mounted to the camera body cover so as to bring a downwardly extending end portion 102 into position to engage the end of another battery 104 as shown in phantom outline. A spring end 106 of member 100 is disposed to lie in a determined position and plane so as to conductively engage the other one of the contacts of the flashlamp as the first contact is engaged at the 45° disposition. The contacts provided by ends 96 and 106 are positioned so as to simultaneously contact and engage the respective conductive leads of the flashlamp as it is moved with the rotation of the socket to bring the leads in way of these contacts. Batteries 94 and 104, of course, are used to "fire" the flashlamp.

USE AND OPERATION

The camera mechanism above-described contemplates that the socket 20 will receive and removably retain a four-member flashlamp or "flash cube" which is currently commercially available. The leads of the several flashlamps when the cube is mounted are disposed to successively be rotated in way of the electrical conductive lead ends 96 and 106 so that the lamp is "fired" while it is in rotative motion and is being moved from about 45° before and to a full front position. The shutter lever 70 is also actuated by the rotation of the socket 20 so that synchronization of flash igniting and film exposure is simply and automatically accomplished. A differential is provided for exposure duration as between the camera using a flash cube for artificial illumination and the same camera absent a flash cube to "take" a picture with natural or other than flash illumination. This differential is accomplished in that spring 64, as it propels the socket 20 forwardly with the engagement of camming member 60 and pin 48, is unable to propel the socket and mounted flash cube at the same speed as it does with the same socket less a flash cube.

The added weight of the flash cube and the resulting inertia slows the rotative motion of the flash cube and socket as against the rotative speed of socket by itself.

To insure that the shutter speed is directly proportional to the speed of the socket and that the pivoted shutter member does not act as a pendulum, it is contemplated that an outwardly extending boss 120 may be formed in front plate 28. This boss is shown in FIGS. 3, 4 and 8 and permits the leftward swinging shutter to just uncover aperture 74 before the left edge of the shutter 70 engages the boss 120. The reaction of the shutter striking the boss plus the bars of spring 73 insures that the shutter returns to cover the aperture at a speed commensurate with the rate of rotation of the socket 20. For example, with a "F-11" stop the exposure time with a flash cube may be about one-fiftieth of a second and without a flash cube the same camera may have an exposure time of one-ninetieth of a second.

With the flashlamp or flash cube mounted in the socket 20, the socket is locked against any rotation, either accidental or intentional, until the front slide member 36 is moved downwardly to actuate the advancing lever means 42. As tab 34 moves from in way of and below the notch 32 and notch portion 30, the socket assembly is free to be rotated and as the lever means 42 moves forwardly, one of the pins 48 engages the camming surface 66 to move camming member 60 outwardly against the bias of spring 64. At or about the time slide member 36 reaches its lowermost position the particular pin 48, which has been moving camming member 60 outwardly, moves from camming surface 66 to propulsive camming surface 67. Thus engaged, the biased member 60 propels socket 20 for further rotation until the next succeeding pin 48 comes into engagement with camming surface 66.

The "firing" of the flashlamp at a point about 45° before the lamp is facing front is merely a matter of selection. As the duration of the ignition or flash of the lamp is a period of microseconds, it is only necessary that the movement of shutter lever 70 to uncover aperture 74 be timed to coincide with sweep of flash as the lamp is ignited and rotated.

In the exemplified apparatus there is provided no cocking of the shutter nor is there a switch which needs be closed to complete the firing of the flashlamp. The socket is not rotated nor is it able to be rotated during "at-rest" periods such as during the advancing or loading of the film; during the period of time the camera is "ready" to be fired; or after the exposure of the film frame.

As the action or period of time used in the one-quarter turn movement of the socket is very short, the release of front slide member 36 by the operator is at or after the socket rotation has ceased, whereat the notch 32 is in position to receive the upwardly moving member 36 as it is urged upwardly by a tension spring 110.

Alternatively it is contemplated that the positive synchronization provided by the above rotation of the socket may be extended with simple modification to the use of exterior or auxiliary lighting means or to a lamp mounted in a single fixed socket. To provide a switch means which utilizes contacts in brush or wiping engagement only during the shutter movement would only require that core 24 have its upper portion movement removed to then become a switch base which would be provided with a contact portion on its lower surface. This contact portion or portions in the rotation of the switch base would then engage contacts similar to contacts 96 and 106 to provide, at the time of engagement, a conductive lead to one side of a lamp or other illuminating means. At the same time a protuberance or pin on the switch base would engage the shutter member to cause a synchronized exposure. This simple arrangement provides a positive synchronization of flash and exposure and with its rotative action the switch contacts are always in a brushed and cleaned condition.

It is to be noted that the synchronized igniting systems above-described all provide a highly desirable condition. With the conductive leads from the lamps only connected during a brief interval of the rotation of the socket or switch base there is no possibility of a "fired" flashlamp being connected to a battery source after ignition and until the film is advanced. In some of the presently known cameras the "fired" flash cube is connected to the battery source until the switch is again cocked during and by film wind. If the "fired" flash cube is not removed or the film advanced to cock the switch to an open condition the connected battery will have a constant low drain which will in a few weeks cause the best small batteries to become dead.

Terms such as "left," "right," "up," "down," "bottom," "top," "front," "back," "in," "out," "clockwise," "counterclockwise" and the like are applicable to the embodiment as shown and described in conjunction with the drawings. These terms are used merely for the purposes of description and do not necessarily apply to the position in which the camera mechanism with rotary flashlamp socket may be constructed or used.

The conception of the camera mechanism and its many applications is not limited to the specific embodiment shown but departures therefrom may be made within the true spirit and scope of the invention and protection is sought to the broadest extent the prior art allows.

What I claim is:

1. A camera mechanism for rotating a rotatable socket base between determined limits and for a determined segment of rotation, said mechanism comprising:
   a. a rotatable socket base adapted to carry an illuminating source;
   b. means for rotating said rotatable socket base for a determined segment of rotation;
   c. at least one conductive contact of the illuminating source carried by the rotatable socket base and movable therewith;
   d. electrically conductive means carried by the camera and disposed in the path of said conductive contact to provide conductive engagement only during the determined segment of rotation, said conductive means adapted to be connected to a source of electrical energy;
   e. a shutter member actuated in response to the rotation of said rotatable socket base, the shutter movement and rotatable socket base rotation being synchronized;

whereby when the rotatable socket base is rotated, the conductive contact engages said electrically conductive means to provide a path for the flow of current to said illuminating source at substantially the same time the shutter member is actuated to expose film.

2. A camera mechanism for rotating a rotatable socket base as in claim 1 in which there is provided in the camera a means movable for engaging the rotatable socket base to prevent rotation of said rotatable socket base until an unexposed frame of film in the camera has been advanced to the exposure position in the camera.

3. A camera mechanism for rotating a rotatable socket base as in claim 1 in which the shutter member has a portion thereof disposed so as to be engaged by means on the rotatable socket base as said base is rotated.

4. A camera mechanism for rotating a rotatable socket base as in claim 3 in which the means on the rotatable socket base engages the shutter portion subsequent to the engagement of the conductive contact of the rotatable socket base with the conductive means.

5. A camera mechanism for rotating a rotatable socket base as in claim 3 in which the shutter member is pivotally carried on a support means and in which the swinging movement of the shutter to cause an exposure of the film is limited by a stop means so that the time of exposure varies in direct relation to the speed of rotation of the rotatable socket base.

6. A camera mechanism for rotating a lamp socket between determined limits and for a determined segment of rotation and during the rotation causing a sweeping of the contacts of a lamp to engage conductive contacts in the camera for an igniting of the lamp in synchronization with the movement of a shutter member, the camera mechanism including: (a) a support; (b) a lamp socket rotatably carried by said support and adapted to receive a lamp; (c) an advancing lever which as it is activated, causes an actuation for the rotative movement of the lamp socket; (d) electrically conductive means carried by said support and disposed in the path of the contacts of a lamp when carried by the rotating socket, said conductive means adapted to be connected to a source of electrical energy, and (e) a shutter member adapted to be actuated by means on the socket and as the socket is rotated the shutter member is actuated to move the shutter to cause an exposure to be made in synchronization with the engaging of the lamp contacts and the electrically conductive means.

7. A camera mechanism for rotating a lamp socket as in claim 6 in which the electrically conductive means are contact members having portions spring-biased into the path of the lamp contacts so that as the lamp contacts are moved with the rotation of the socket the lamp contacts are moved onto, over and past the contact members to provide a self-cleaning actuation of the contact members.

8. A camera mechanism for rotating a lamp socket as in claim 6 in which the electrically conductive means disposed in way of the lamp contacts are contact members sized and positioned to be engaged by the lamp contacts only during a portion of the rotation cycle of the socket, the lamp contacts being out of conductive relationship with the contact members when the lamp socket is in an at-rest condition.

9. A camera mechanism for rotating a lamp socket as in claim 6 in which there is provided means movable for engaging the socket to prevent rotation except when the advancing lever is actuated to cause said rotative actuation of the socket.

10. A camera mechanism for rotating a lamp socket as in claim 9 in which the advancing lever is engaged by and moved by the actuation of a slide member and in which the means movable for engaging the socket is a portion of the slide member, said member portion disposed to enter and engage one of a plurality of notches formed in the socket.

11. A camera mechanism for rotating a lamp socket as in claim 10 in which the support is a plate upon which is mounted the lamp socket, the advancing lever, the shutter member and the slide member.

12. A camera mechanism for rotating a lamp socket as in claim 9 in which the advancing lever is moved in response to the actuation of a slide member and in which the means movable for engaging the socket to prevent rotation of the socket is a portion formed on the slide member, said portion disposed to enter and engage one of a plurality of notches formed in the socket.

13. A camera mechanism for rotating a lamp socket as in claim 12 in which the notches in the socket are four in number and are formed in notch portions provided on a core portion of the socket.

14. A camera mechanism for rotating a lamp socket as in claim 6 in which the socket is provided with a plurality of engaging means and in which the advancing lever as it is activated moves into engagement with one of said engaging means to rotate the socket.

15. A camera mechanism for rotating a lamp socket as in claim 14 in which the engaging means carried by the socket are member portions extending from the socket.

16. A camera mechanism for rotating a lamp socket as in claim 6 in which the shutter member is pivotally mounted on the support and in its initial condition is spring-biased to engage a stop and when in engagement with said stop is adjacent to and covers an aperture disposed to admit light to a film when said aperture is uncovered.

17. A camera mechanism for rotating a lamp socket as in claim 16 in which the swinging movement of the shutter member from its initial condition is limited by a second stop means so that the time of exposure varies in direct relation to the speed of rotation of the lamp socket.

18. A camera mechanism for rotating a lamp socket as in claim 6 in which the socket has a plurality of equally spaced pin members extending therefrom and in which the shutter member has an arm portion disposed to lie in way of the transcribed path of said pin members as the socket is rotated.

19. A camera mechanism for rotating a lamp socket as in claim 18 in which the equally spaced pin members are four in number and extend downwardly from the socket and in which the arm portion of the shutter is inturned to lie at substantially right angles to the plane of the shutter member.

20. A camera mechanism for rotating a lamp socket as in claim 6 in which the lamp socket is adapted to receive and retain a multilamp device which is rotated in 90° segments from a starting position to a finishing position, and in which the electrically conductive means have their contacting ends spring-biased into the path of the lamp contacts and at a contacting position within said determined segment between 30° and 60° from the finishing position.

21. A camera mechanism for rotating a lamp socket as in claim 20 in which the source of electrical energy is a battery carried in the camera.

22. A camera mechanism for rotating a lamp socket as in claim 6 in which the lamp socket is adapted to receive and retain a multilamp device which is rotated in 90° segments from a starting position to a finishing position, and in which the electrically conductive means have their contacting ends disposed to engage the lamp contacts at a position within said determined segment about 45° from the finishing position.

23. A camera mechanism for rotating a lamp socket as in claim 22 in which the socket is adapted to receive a multilamp device having four equally spaced flashlamps and in which the means for actuating the shutter are four equally spaced pins carried by the socket, each pin disposed in its sweep of movement to engage an arm portion of the shutter to actuate an exposure, the positioning of the pins and the multilamp contacts being disposed in a determined relationship to each other so that the igniting of a lamp occurs at substantially the same time in the socket rotation as the actuation of the shutter.

24. A camera mechanism for rotating a lamp socket between determined limits and for a determined segment of rotation, the camera mechanism including: (a) a support, (b) a lamp socket rotatably carried by said support and adapted to receive a lamp; (c) an advancing lever which in its forward movement provides an initial portion of the segment of rotation of the lamp socket required to advance a lamp from a beginning socket position to a finishing position, (d) a camming member having first and second camming surfaces the remaining portion of said segment of rotation being provided by said camming member, (e) a plurality of equally spaced camming follower portions on said socket; said camming member being biased into engagement with one of said equally spaced camming follower portions, said last-mentioned camming follower portion being disposed to engage said first cam surface on the camming member to move said camming member against the bias during the rotational movement of the socket provided by the forward movement of the advancing lever, and at the termination of this initial portion of the rotational movement, said last-mentioned camming follower portion on the socket is engaged by a said second camming surface on the camming member wherein, and by the residual bias applied to said camming member, the last-mentioned camming follower portion is moved so as to rotate the socket to its finishing position.

25. A camera mechanism for rotating a lamp socket as in claim 24 in which the camming member is pivotally mounted on and carried by the support and in which the camming follower portions are equally spaced pins carried by and extending from the socket.

26. A camera mechanism for rotating a lamp socket as in claim 25 in which the socket in its starting position has two adjacent pins of the equally spaced pins in engagement with the camming member for determinedly positioning the socket.

27. A camera mechanism for rotating a lamp socket as in claim 26 in which the equally spaced pins are four in number and extend downwardly from the socket.

28. A camera mechanism for rotating a lamp socket as in claim 27 in which there is provided a shutter member pivotally mounted on the support and having an arm portion disposed to lie in the transcribed path of the equally spaced pins so as to be engaged by one of said pins to move the shutter to cause an exposure to be made.